United States Patent
Engh-Halstvedt et al.

(10) Patent No.: US 9,530,241 B2
(45) Date of Patent: Dec. 27, 2016

(54) CLIPPING OF GRAPHICS PRIMITIVES

(71) Applicant: ARM Limited, Cambridge (GB)

(72) Inventors: Andreas Due Engh-Halstvedt, Trondheim (NO); Frode Heggelund, Trondheim (NO); Jørn Nystad, Trondheim (NO)

(73) Assignee: ARM Limited, Cambridge (GB)

( * ) Notice: Subject to any disclaimer, the term of this patent is extended or adjusted under 35 U.S.C. 154(b) by 104 days.

(21) Appl. No.: 14/536,070

(22) Filed: Nov. 7, 2014

(65) Prior Publication Data

US 2015/0161814 A1   Jun. 11, 2015

(30) Foreign Application Priority Data

Dec. 11, 2013 (GB) .................................. 1321898.7

(51) Int. Cl.
*G06T 15/30* (2011.01)
*G06T 15/00* (2011.01)
*G06T 1/20* (2006.01)
*G06T 1/60* (2006.01)

(52) U.S. Cl.
CPC .................. *G06T 15/30* (2013.01); *G06T 1/20* (2013.01); *G06T 1/60* (2013.01); *G06T 15/005* (2013.01); *G06T 2210/52* (2013.01)

(58) Field of Classification Search
CPC ................................................... G06T 15/30
See application file for complete search history.

(56) References Cited

U.S. PATENT DOCUMENTS

| | | |
|---|---|---|
| 5,990,904 A | 11/1999 | Griffin |
| 6,169,554 B1 | 1/2001 | Deering |
| 6,359,630 B1 | 3/2002 | Morse et al. |
| 6,686,924 B1 | 2/2004 | Mang et al. |
| 6,967,644 B1 | 11/2005 | Kobayashi |
| 2002/0030693 A1* | 3/2002 | Baldwin .................. G06T 15/30 345/620 |
| 2003/0067468 A1* | 4/2003 | Duluk, Jr. .................. G06T 1/60 345/506 |
| 2005/0285850 A1* | 12/2005 | Heim ..................... G06T 15/005 345/418 |
| 2006/0061596 A1 | 3/2006 | Jiao |
| 2007/0206027 A1 | 9/2007 | Chen |

(Continued)

OTHER PUBLICATIONS

GB Search Report for GB Application No. 1321898.7, dated May 30, 2014, 3 pages.

(Continued)

*Primary Examiner* — Carlos Perromat
(74) *Attorney, Agent, or Firm* — Nixon & Vanderhye P.C.

(57) ABSTRACT

Techniques for performing clipping of graphics primitives 60 with respect to a clipping boundary 65 are described. The clipping step 10 may be performed separately for each tile of a graphics frame to be rendered, after a primitive list for the tile has been read from a primitive memory 38. Clipping may be performed only for larger primitives whose size exceeds a given threshold. Clipping of a primitive 60 to the clipping boundary 65 may be performed inexactly so that only a single clipped primitive is generated which may extend beyond the clipping boundary. A clipped primitive generated by clipping may be used for a depth function calculation of a primitive setup operation and not for an edge determination.

10 Claims, 6 Drawing Sheets

(56) References Cited

U.S. PATENT DOCUMENTS

| | | | | |
|---|---|---|---|---|
| 2008/0094412 A1* | 4/2008 | Jiao | ............... | G06T 15/005 345/621 |
| 2009/0195555 A1* | 8/2009 | Nystad | ............... | G09G 5/363 345/620 |
| 2009/0303245 A1* | 12/2009 | Soupikov | ............... | G06T 15/005 345/582 |
| 2011/0148901 A1* | 6/2011 | Adams | ............... | G06T 11/40 345/589 |
| 2012/0206447 A1* | 8/2012 | Hutchins | ............... | G06T 15/005 345/419 |
| 2014/0267259 A1* | 9/2014 | Frascati | ............... | G06T 15/005 345/423 |
| 2014/0362081 A1* | 12/2014 | Cerny | ............... | G06T 15/005 345/426 |

OTHER PUBLICATIONS

Olano, M. et al., "Triangle Scan Conversion using 2D Homogeneous Coordinates", printed on Nov. 7, 2014, 7 pages.

Griesen, F., "A trip through the Graphics Pipeline 2011, Part 5", The Ryg Bloc, (Jul. 5, 2011), 10 pages.

UK Search Report issued Nov. 19, 2014 relating to claims 11-21 in GB 1321898.7, 2 pages.

UK Search Report issued Nov. 20 2014 relating to claims 22-28 in GB 1321898.7, 3 pages.

UK Search Report issued Nov. 24 2014 relating to claims 29-33 in GB 1321898.7, 2 pages.

S. Dietrich, "Guard Band Clipping in Direct3D" from http://developer.download.nvidia.com/assets/gamedev/docs/Guard_Band_Clipping.pdf archived version of page dated Jul. 14, 2011, accessed Nov. 19, 2014, 7 pages.

* cited by examiner

CLIPPING OF GRAPHICS PRIMITIVES

CROSS-REFERENCE TO RELATED APPLICATIONS

This application claims priority to GB Application No. 1321898.7, filed on Dec. 11, 2013; the entire content of which is hereby incorporated by reference.

The present technique relates to the field of graphics processing. In particular, it relates to methods and apparatuses for processing graphics primitives.

When processing 3D graphics, a scene to be displayed is typically split into a number of basic components called "primitives" in order to allow the 3D graphics processing operations to be more readily carried out. The primitives are usually in the form of simple polygons, such as triangles. Each primitive is typically defined by the vertices that make up the primitive, and each vertex will have associated with it particular data values representing the primitive at the vertex position, for example the X and Y position of the vertex, a depth (Z) value, colour and transparency values, etc.

Within the graphics processing system, a primitive setup stage is performed that uses the data defined for each vertex of a given primitive in order to determine a plurality of functions for that primitive, such as edge functions that represent the geometric edges of the primitive, and a depth function used to determine a depth value at any particular point within the primitive. The primitive setup stage may also determine other functions such as interpolation functions that represent the way that attributes such as colour values will vary across the primitive.

Following the primitive setup stage, a graphics primitive may be passed through a rasterization stage, where a rasterization operation is performed in order to determine a plurality of graphics fragments to be used to represent that graphics primitive, the rasterization operation determining the X and Y positions of each of those graphics fragments. Following rasterization, the graphics fragments are then passed through a rendering stage where the graphics fragments are subjected to colouring operations, shading operations, etc., in order to generate an output for display on a display screen.

Each graphics fragment (data element) may correspond to a single pixel (picture element) in the final display, or it can be the case that there is not a one-to-one correspondence between fragments and display pixels, for example where particular forms of post-processing such as down-scaling are carried out on the blended image prior to displaying the final image.

In 3D graphics processing, rendering conceptually takes place within a so-called "view frustum", which is, in effect, a box in front of the viewer's position which represents the three-dimensional volume within which primitives may need to be rendered for display. The view frustum is effectively defined by having top, left, bottom and right edge planes which define a viewport representing the edges of the view frustum, and near and far depth planes which represent the front and back planes of the view frustum (representing the closest and furthest distances at which objects can appear). The viewport typically corresponds to the size of the display screen.

It is typically desirable to only render the parts of the scene that will actually be seen, i.e. are within the view frustum, and one known technique to achieve this is to "clip" primitives against the view frustum edge and depth planes prior to performing the above-described primitive setup, rasterization and rendering processes. This often requires new primitives to be geometrically generated in order to represent the part of a primitive that remains within the view frustum after the clipping process. However, such a clipping process is fairly complex and slow, and difficult to implement. As described in commonly-owned U.S. Pat. No. 8,115,783, the entire contents of which are hereby incorporated by reference, one known technique to try and reduce the amount of clipping required is referred to as "guard band clipping". In guard band clipping, the edge planes against which primitives are tested for clipping purposes are extended to beyond (outside) the view frustum. Whilst in some guard band arrangements, the guard band is set to a finite value such as a defined number of pixels or fragments, in an alternative arrangement the clipping area edge planes are effectively set to "infinity", thereby using an infinite guard band. Such an approach hence enables clipping to be avoided at the geometry processing stage, and instead additional steps can be taken later when processing the fragments to ensure that fragments outside the view frustum are not displayed.

However, while avoiding clipping removes the problems associated with the clipping process itself, clipless rendering adds its own set of problems. Without clipping, primitives might extend very far outside the view frustum or the guard band. In some cases, the primitives might project to infinity. Such very large primitives can cause numerical precision or stability issues in subsequent calculations if they are not clipped. Hence, there are a number of problems associated with performing clipping. The present technique seeks to make clipping more efficient.

One aspect comprises a method of processing graphics primitives for a frame to be displayed, the method comprising steps of:

allocating each primitive to at least one of a plurality of tiles forming the frame to be displayed;

for each tile, storing in a primitive memory a primitive list identifying vertex data for vertices of the primitives allocated to the corresponding tile; and performing tile processing separately for each tile, the tile processing comprising:

(i) reading the primitive list for the tile from the primitive memory;

(ii) if the primitive list identifies a target primitive that satisfies a clipping condition, performing a clipping operation for clipping the target primitive with respect to the clipping boundary to generate additional vertex data for at least one additional vertex for a clipped primitive not identified in the primitive list, the clipped primitive extending beyond the clipping boundary by a smaller amount than the target primitive;

(iii) performing at least one further graphics processing operation using the vertex data identified in the primitive list and the additional vertex data generated by the clipping operation; and (iv) outputting display data generated by the at least one further graphics processing operation for the tile.

Tile-based graphics processing systems divide a frame to be displayed into a number of tiles and then process each tile separately to generate display data representing the graphics to be displayed in the corresponding tile. When all the tiles have been processed, the frame as a whole can be displayed. In a tile-based technique, clipping of primitives with respect to a clipping boundary is typically done before the primitives allocated to each tile are stored in a primitive memory. However, clipping can result in additional clipped primitives being generated with additional vertex data. Therefore, the clipping operation can increase the amount of data that needs to be read from the primitive memory. As the same primitive may appear in several tiles, any additional data associated with a clipped primitive in the primitive memory may need to be read multiple times, and so performing clipping prior to the primitive memory can greatly increase the amount of bus traffic passing between the primitive memory and other parts of a processing system for performing the processing of each tile, which can limit performance.

To address these problems, a clipping operation for reducing the extent by which primitives extend beyond the clipping boundary may instead be performed on a tile-by-tile basis after the primitive list for a given tile has been read from the primitive memory. Any clipped primitive generated by the clipping operation can then be used for a further graphics processing operation for that tile without any additional vertex data being stored in the primitive memory, avoiding the need for a large primitive memory bus bandwidth. Hence, performing the clipping at a later stage than in conventional systems can address some of the issues discussed above.

A cache memory may be provided for storing the additional vertex data generated by the clipping operation. The cache memory has a lower access latency than the primitive memory and so can be accessed more efficiently than the primitive memory. This is useful because the same clipped primitive may be required for multiple tiles. When additional vertex data has been generated for a clipped primitive when processing one tile, the additional vertex data can be stored in the cache for use if other tiles require the same data, so that it is not necessary to generate the additional vertex data again.

For each primitive in the primitive list, the vertex data may define various attributes of each vertex of the primitive. For example, the attributes may include vertex coordinates representing the x, y position of each vertex as well as other attributes of the vertices such as colour, depth or opacity. Similarly, the additional vertex data may identify corresponding attributes of the additional vertices of the clipped primitives. In some embodiments, the additional vertex data may identify these attributes using absolute data values. However, in other embodiments it may be more efficient for the additional vertex data of a clipped primitive to be represented by weight values for determining the additional vertex data from the original vertex data of the target primitive from which the clipped primitive was derived. For example, several different attributes of the additional vertex data may be related to the corresponding attributes of the original vertex data using the same weight values, and so using weight values can help to reduce the amount of data required to define the vertices of the clipped primitives. In some examples, the weight values may be combined with the original vertex data in a linear manner, while in other examples the weights may define a non-linear variation of the original vertex data to generate the additional vertex data.

The clipping boundary for clipping may correspond to a boundary of a view frustum (e.g. corresponding to the edge of a display screen). Alternatively, the clipping boundary may be outside the boundary of a view frustum (for example where the clipping boundary corresponds to a guard band outside the view frustum).

The clipping condition which determines whether a target primitive is clipped may have various forms. In some cases, any target primitive extending beyond the clipping boundary may be clipped. In other cases, there may be a further criteria, such as whether the size of the target primitive is greater than the given threshold (this condition will be described in more detail below with reference to the fourth to sixth aspects of the present technique). Therefore, it is not essential for every primitive that crosses the clipping boundary to be clipped.

The at least one further graphics processing operation may include, for example, a primitive setup operation or a rasterization operation.

The clipping operation for clipping the target primitive with respect to the clipping boundary may take various forms. In one example, the target primitive may be clipped exactly to the clipping boundary so that the clipped primitive corresponds to the region of the target primitive that was inside the clipping boundary ("exact clipping"). In another example, "inexact clipping" may be performed so that the clipped primitive does not correspond exactly to the region of the target primitive that was inside the clipping boundary, and may include a portion lying outside the clipping boundary (see the discussion of the seventh to ninth aspects of the present technique below). Also, it is possible for the clipping operation to comprise a "pseudo clipping" operation in which the clipped primitive is used for some parts of the subsequent graphics processing (e.g. depth function determination) while other parts of the graphics processing use the original target primitive (see the tenth to twelfth aspects discussed below). The additional vertex data can be used to create/emulate new primitives as if clipping occurred.

A second aspect comprises an apparatus for processing graphics primitives for a frame to be displayed, comprising:
   allocation circuitry configured to allocate each primitive to at least one of a plurality of tiles forming the frame to be displayed;
   a primitive memory configured to store for each tile a primitive list identifying vertex data for vertices of the primitives allocated to the corresponding tile; and
   a tile processing pipeline configured to perform tile processing separately for each tile, the tile processing comprising:
   (i) reading the primitive list for the tile from the primitive memory;
   (ii) if the primitive list identifies a target primitive that satisfies a clipping condition, performing a clipping operation for clipping the target primitive with respect to the clipping boundary to generate additional vertex data for at least one additional vertex for a clipped primitive not identified in the primitive list, the clipped primitive extending beyond the clipping boundary by a smaller amount than the target primitive;
   (iii) performing at least one further graphics processing operation using the vertex data identified in the primitive list and the additional vertex data generated by the clipping operation; and
   (iv) outputting display data generated by the at least one further graphics processing operation for the tile.

A third aspect provides an apparatus for processing graphics primitives for a frame to be displayed, comprising:
   allocation means for allocating each primitive to at least one of a plurality of tiles forming the frame to be displayed;
   primitive memory means for storing for each tile a primitive list identifying vertex data for vertices of the primitives allocated to the corresponding tile; and
   tile processing means for performing tile processing separately for each tile, the tile processing comprising:
   (i) reading the primitive list for the tile from the primitive memory means;
   (ii) if the primitive list identifies a target primitive that satisfies a clipping condition, performing a clipping operation for clipping the target primitive with respect to the clipping boundary to generate additional vertex data for at least one additional vertex for a clipped primitive not identified in the primitive list, the clipped primitive extending beyond the clipping boundary by a smaller amount than the target primitive;

(iii) performing at least one further graphics processing operation using the vertex data identified in the primitive list and the additional vertex data generated by the clipping operation; and (iv) outputting display data generated by the at least one further graphics processing operation for the tile.

A fourth aspect provides a method of processing graphics primitives for display, wherein the primitives have vertex coordinates represented in floating-point format, comprising steps of:

determining, based on the vertex coordinates for a target primitive to be processed, a primitive size parameter indicative of a size of the target primitive;

if the primitive size parameter exceeds a predetermined threshold, performing a clipping operation on the target primitive with respect to a clipping boundary to generate at least one clipped primitive which extends beyond the clipping boundary by a smaller amount than the target primitive, and performing at least one graphics processing operation using the at least one clipped primitive; and if the primitive size parameter does not exceed the predetermined threshold, omitting the clipping operation for the target primitive and performing the at least one graphics processing operation using the target primitive.

As discussed above, performing clipping can be complex, slow and difficult to implement, and so some "clipless" systems avoid clipping altogether. However, clipless rendering itself causes problems because vertex coordinates for the primitives, and hence positions within the primitive in general, are typically represented in the floating-point format. This means that when primitives become very large, the floating point format no longer has sufficient precision to represent finely varying values of position coordinates across the full range of the primitive. This can cause issues where subsequent operations, such as a texturing operation for example, lose resolution because of the lack of floating-point precision available for representing the position coordinates.

However, the present technique recognizes that the problems caused by loss of floating-point precision arise only for the very largest primitives. Smaller primitives do not cause floating-point precision or stability issues because the numeric range required for representing the positions of the extremities of the smaller primitives can fit within the floating-point format while still leaving sufficient bit space for representing finer variation of the coordinates. By determining a primitive size parameter indicative of the size of the target primitive, and determining whether to perform a clipping operation based on whether the primitive size parameter exceeds a predetermined threshold, the processing complexity and overhead associated with the clipping process can be avoided for many smaller primitives, for which the original target primitive can be used for subsequent graphics processing without risk of floating-point precision errors, while the clipping operation may still be performed for larger primitives. This greatly reduces the amount of clipping required and so improves overall throughput.

There are a number of parameters which could be used as the primitive size parameter for determining whether to perform the clipping operation. A simple approach may be to use the magnitude of one of the vertex coordinates for the target primitive as the primitive size parameter (particularly the maximum magnitude among the magnitudes of the vertex coordinates). Alternatively, a more complex function of the vertex coordinates may be used as the primitive size parameter.

The predetermined threshold may be selected to have a value such that any primitive having a primitive size not exceeding a threshold can be processed by the subsequent graphics processing operations without errors caused by loss of floating-point precision. The particular value for the threshold will depend on which floating-point representation is used by the graphics processing. For example, it has been found that for single precision floating-point values, unclipped primitives may not cause loss of floating-point precision if they extend by no more than 32K ($2^{15}$) pixels along any axis of the coordinate system for the vertex coordinates. Hence, by setting the threshold such that a primitive which is longer than $2^{15}$ pixels is considered to have a size exceeding the threshold, clipping can be restricted to the larger triangle for which there is a risk of loss of floating point precision. A $2^{16}$ pixel threshold may also be used, as this may be more convenient—$2^{16}$ pixels may be the maximum required resolution to support, and so it can be easier to add one extra bit to the fixed-point logic than to special case half the screen. Inspection of real-world content and benchmarks has found that in practice over 99% of primitives are smaller than this threshold and so do not require clipping even if they cross the clipping boundary. Hence, even if the clipping operation for the remaining 1% of primitives requires substantial amount of processing, this does not greatly affect the overall throughput of the graphics processing pipeline.

Although the size indicator may indicate the size of which triangles that should be clipped or not, edges of a triangle with a large size indicator may not be clipped if they are shared with a smaller primitive that has a lesser size indicator such that it will not be clipped. This ensures that shared edges are clipped equally for all primitives sharing that edge.

As for the first to third aspects, the clipping boundary may correspond to the boundary of a view frustum, or could be another boundary outside the view frustum, such as the boundary of a guard band. The predetermined threshold for determining primitive size may be set to correspond to a threshold boundary lying outside the clipping boundary so that, while primitives extending beyond the threshold boundary are clipped and primitives lying wholly within the threshold boundary remain unclipped, any primitives crossing the threshold boundary are clipped with respect to the clipping boundary rather than the threshold boundary corresponding to the size threshold.

As for the first to third aspects, the clipping operation may comprise exact clipping, inexact clipping, or pseudo clipping as discussed above. Again, any generated clipped primitives may be represented using weight values for determining vertex data (e.g. vertex coordinates or other attributes such as colour or depth) of the clipped primitive from the vertex data of the original target primitive. Any subsequent graphics processing operation, such as a primitive setup operation or rasterization operation can then apply the weight values to the vertex data of the target primitive to determine corresponding values for the clipped primitives.

A fifth aspect provides an apparatus for processing graphics primitives for display, wherein the primitives have vertex coordinates represented in floating-point format, the apparatus comprising processing circuitry configured to:

(i) determine, based on the vertex coordinates for a target primitive to be processed, a primitive size parameter indicative of a size of the target primitive;
(ii) if the primitive size parameter exceeds a predetermined threshold, perform a clipping operation on the target primitive with respect to a clipping boundary to generate at least one clipped primitive which extends beyond the clipping boundary by a smaller amount than the target primitive, and perform at least one graphics processing operation using the at least one clipped primitive; and
(iii) if the primitive size parameter does not exceed the predetermined threshold, omit the clipping operation for the target primitive and perform the at least one graphics processing operation using the target primitive.

A sixth aspect provides an apparatus for processing graphics primitives for display, wherein the primitives have vertex coordinates represented in floating-point format,
the apparatus comprising processing means for:
(i) determining, based on the vertex coordinates for a target primitive to be processed, a primitive size parameter indicative of a size of the target primitive;
(ii) if the primitive size parameter exceeds a predetermined threshold, performing a clipping operation on the target primitive with respect to a clipping boundary to generate at least one clipped primitive which extends beyond the clipping boundary by a smaller amount than the target primitive, and performing at least one graphics processing operation using the at least one clipped primitive; and
(iii) if the primitive size parameter does not exceed the predetermined threshold, omitting the clipping operation for the target primitive and performing the at least one graphics processing operation using the target primitive.

The features of the fourth to sixth aspects may be combined with those of the first to third aspects, to provide a tile-based processing system in which, after reading the primitive list for a given tile, it is determined whether a target primitive in the primitive list has a size parameter exceeding the predetermined threshold, and if so then clipping is performed on the target primitive, while target primitives in the primitive list having a size not exceeding the threshold are not clipped.

Alternatively, the fourth, fifth and sixth aspects may be used independently of the first, second and third aspects. For example, it is possible to provide the size threshold for clipping in an immediate mode renderer rather than a tile-based system, or in a system which performs the clipping operation before the primitives are allocated to particular tiles, with the clipped primitives then being identified in the primitive list stored in the primitive memory.

A seventh aspect provides a method of processing graphics primitives for display, wherein the primitives have vertex coordinates represented in floating-point format, comprising steps of:
performing a clipping operation on a target primitive with respect to a clipping boundary to generate a single clipped primitive corresponding to the target primitive that extends beyond the clipping boundary by a smaller amount than the target primitive; and
performing at least one graphics processing operation using the clipped primitive;
wherein if an internal portion of the target primitive lying within the clipping boundary cannot be represented using only one primitive, then the clipping operation generates the single clipped primitive comprising an internal region corresponding to said internal portion of the target primitive and an external region lying beyond the clipping boundary.

Conventionally, if a primitive is clipped with respect to a clipping boundary, then one or more clipped primitives are generated which correspond exactly to the internal portion of the primitives lying within the clipping boundary. However, this can increase the number of primitives required. If the internal portion of the target primitive cannot be represented using only one primitive, then multiple primitives may be generated and each additional primitive generated will have additional vertices and associated vertex data. This can require significant amounts of storage.

The present technique recognizes that it is not essential for a primitive to be clipped exactly to the clipping boundary. By allowing some parts of the clipped primitive to extend beyond the clipping boundary, it is often possible to generate a single clipped primitive corresponding to the target primitive, thus avoiding the need to generate multiple primitives. Hence, the amount of additional vertex data generated by the clipping operation can be reduced, making processing and memory use more efficient.

The clipping operation may ensure that the generated single clipped primitive lies entirely within a second boundary which is outside the clipping boundary. The second boundary may be such that any primitive lying inside the second boundary can be processed by subsequent graphics processing without errors caused by loss of floating-point precision. For example, the second boundary may correspond to the 32K pixel boundary mentioned above for the fourth to sixth aspects. As long as the clipped primitives are clipped to within the second boundary, then the subsequent processing will produce correct results, and this allows a larger degree of freedom as to how the clipping is performed, so that a single clipped primitive can be generated to make the clipping less costly.

Again, any additional vertex data for the clipped primitive generated by the clipping operation may be represented using weight values for determining the additional vertex data from the original vertex data of the target primitive. There may be more than one way in which a single clipped primitive can be generated from the target primitive while still lying within the second boundary or meeting some other criterion. If there are several candidate primitives that could be selected as the clipped primitive, then the clipping operation may select the single clipped primitive so as to reduce the memory or processing overhead associated with handling the weight values for the clipped primitive. Hence, if a particular clipped primitive would help to reduce the amount of storage required or processing required for handling the weight values representing the additional vertex data for the clipped primitive, then this primitive can be selected in preference to other primitives.

The seventh aspect may be used in an immediate mode rendering system. However, the seventh aspect may be particularly useful for a tile-based rendering system, because in a tile-based rendering system the same primitive may need to be processed several times for different tiles. By reducing the number of additional primitives, the tile-based processing can be made more efficient.

An eighth aspect provides an apparatus for processing graphics primitives for display, wherein the primitives have vertex coordinates represented in floating-point format,
the apparatus comprising processing circuitry configured to:
(i) perform a clipping operation on a target primitive with respect to a clipping boundary to generate a single clipped primitive corresponding to the target primitive that extends beyond the clipping boundary by a smaller amount than the target primitive; and (ii) perform at least one graphics processing operation using the clipped primitive;

wherein if an internal portion of the target primitive lying within the clipping boundary cannot be represented using only one primitive, then the clipping operation generates the single clipped primitive comprising an internal region corresponding to said internal portion of the target primitive and an external region lying beyond the clipping boundary.

A ninth aspect provides an apparatus for processing graphics primitives for display, wherein the primitives have vertex coordinates represented in floating-point format, the apparatus comprising processing means for:

(i) performing a clipping operation on a target primitive with respect to a clipping boundary to generate a single clipped primitive corresponding to the target primitive that extends beyond the clipping boundary by a smaller amount than the target primitive; and (ii) performing at least one graphics processing operation using the clipped primitive;

wherein if an internal portion of the target primitive lying within the clipping boundary cannot be represented using only one primitive, then the clipping operation generates the single clipped primitive comprising an internal region corresponding to said internal portion of the target primitive and an external region lying beyond the clipping boundary.

The seventh to ninth aspects may be combined with the first to third aspects if desired so that when clipping is performed in a tile-based blending system at a stage subsequent to reading the primitive list for a given tile from the primitive memory, then the clipping operation may be an inexact clipping as discussed for the seventh to ninth aspects. Similarly, the seventh to ninth aspects may be combined with the fourth to sixth aspects to provide a system in which a decision is made based on primitive size whether to perform a clipping operation, and if the clipping operation is required it is performed with inexact clipping to the clipping boundary as in the seventh to ninth aspects.

A tenth aspect provides a method of processing a graphics primitive for display, wherein the primitive has vertex coordinates represented in floating-point format, comprising steps of:

performing a primitive setup operation comprising an edge determination for determining which positions are inside or outside an edge of a target primitive and a depth function determination for determining a depth function for determining depth values within the target primitive; and performing a further graphics processing operation using the target primitive, the edge determination, and the depth function;

wherein if the target primitive satisfies a clipping condition, then the depth function determination is performed using a clipped primitive that extends beyond the clipping boundary by a smaller amount than the target primitive, and the edge determination is performed using the target primitive without clipping.

The processing of graphics primitives typically includes a primitive setup operation which determines various properties of the primitive. The primitive setup may often include an edge determination for determining which positions are inside or outside an edge of a given primitive. In some examples, the edge determination may determine an edge function to represent mathematically an edge of the primitive, which can later be used for determining which positions lie inside or outside the primitive edge. In other cases, the edge determination may perform a cross product of a vector linking vertex coordinates of the primitive and a vector linking one of the coordinates to the point of interest, and the sign of the cross product may then indicate whether the point of interest lies inside or outside the primitive. The primitive setup operation may also include a depth function determination for determining a depth function for determining a depth value at a given point within the primitive.

The present technique recognizes that the floating-point precision issues discussed above typically occur during the depth function determination rather than during the edge determination. Hence, to simplify processing, if clipping is required because a target primitive satisfies a clipping condition, then the depth function may be determined using a clipped primitive generated by the clipping operation while the edge determination may still be based on the original target primitive without clipping. A further graphics processing operation may then use the original target primitive (unclipped), the determined edge function or other data indicating whether points lie inside or outside the primitive, and the depth function. This reduces the complexity of the edge determination. Many other properties of the primitive may also be determined based on the original target primitive, and so it is not necessary to generate additional primitives for calculating these primitive setup functions. For the depth function, a temporary clipped primitive can be generated, but this is not required for other parts of the processing. Hence, this technique allows the numerical issues associated with the use of floating-point vector coordinates to be addressed for the depth function without the increased complexity associated with clipping (e.g. additional primitives or additional vertices) affecting other parts of the graphics processing.

While exact clipping could be performed, it may be more efficient to perform inexact clipping so that only a single clipped primitive is required, as discussed above for the seventh to ninth aspects. Where the clipped primitive is used only for the depth function calculation and not for other parts of the graphics processing, if it is possible to select the clipped primitive so it has a smaller area than the internal portion of the target primitive that lies within the clipping boundary, without adversely affecting the outcome of subsequent graphics processing. This can provide a greater freedom in selecting the clipped primitive, which can be useful for reducing the cost of clipping.

An eleventh aspect provides an apparatus for processing a graphics primitive for display, wherein the primitive has vertex coordinates represented in floating-point format, the apparatus comprising:

primitive setup circuitry configured to perform a primitive setup operation comprising an edge determination for determining which positions are inside or outside an edge of a target primitive and a depth function determination for determining a depth function for determining depth values within the target primitive; and processing circuitry configured to perform a further graphics processing operation using the target primitive, the edge determination, and the depth function;

wherein if the target primitive satisfies a clipping condition, then the primitive setup circuitry is configured to perform the depth function determination using a clipped primitive that extends beyond the clipping boundary by a smaller amount than the target primitive, and to perform the edge function determination using the target primitive without clipping.

A twelfth aspect provides an apparatus for processing a graphics primitive for display, wherein the primitive has vertex coordinates represented in floating-point format, the apparatus comprising:

primitive setup means for performing a primitive setup operation comprising an edge determination for determining which positions are inside or outside an edge of a target primitive and a depth function determination for determining a depth function for determining depth values within the target primitive; and processing means for performing a further graphics processing operation using the target primitive, the edge determination, and the depth function;

wherein if the target primitive satisfies a clipping condition, then the primitive setup means is configured to perform the depth function determination using a clipped primitive that extends beyond the clipping boundary by a smaller amount than the target primitive, and to perform the edge determination using the target primitive without clipping.

The tenth to twelfth aspects may be combined with any of the earlier aspects.

In some examples, the methods may be implemented using a computer program stored on a computer readable storage medium. When executed by the computer, then the computer program may control the computer to perform the method of processing graphics primitives.

Further aspects, features and advantages of the present technique will be apparent from the following description of example embodiments with reference to the accompanying drawings, in which:

FIG. 1 is a flow diagram illustrating processing of graphics primitives for display;

FIGS. 2A and 2B schematically illustrate a portion of a graphics processing apparatus for performing the graphics processing;

Figure 1:
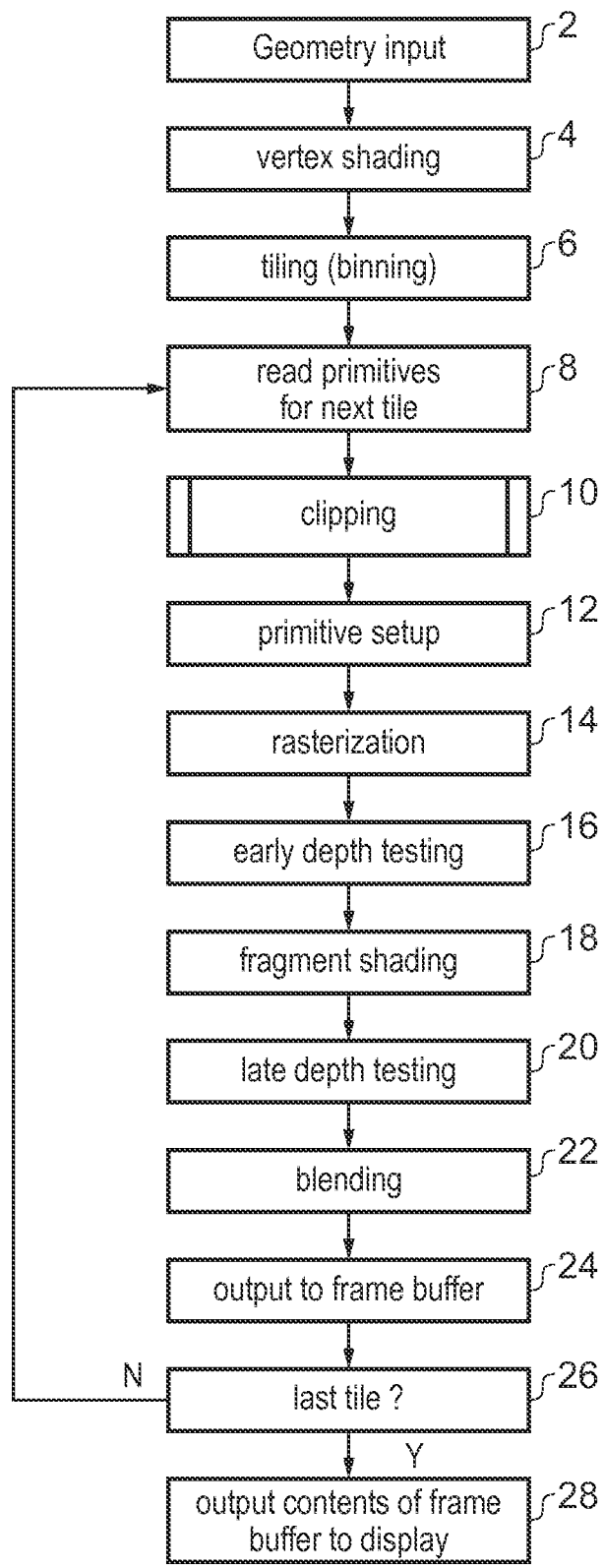
Figure 2A:
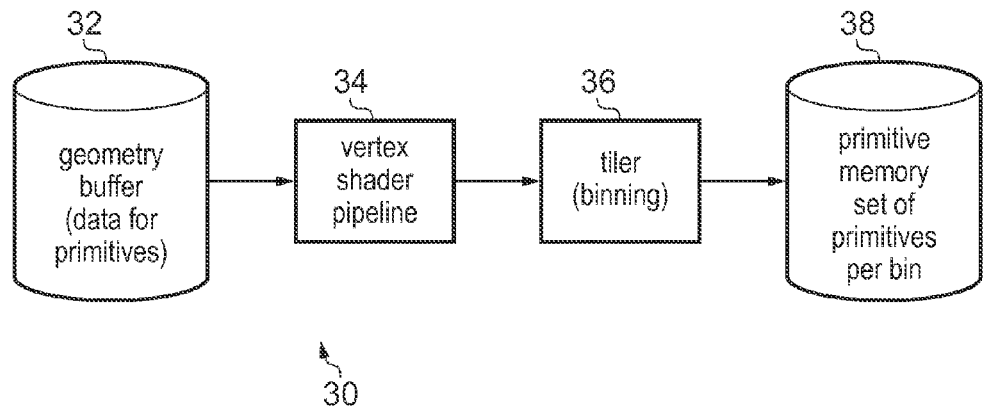
Figure 2B:
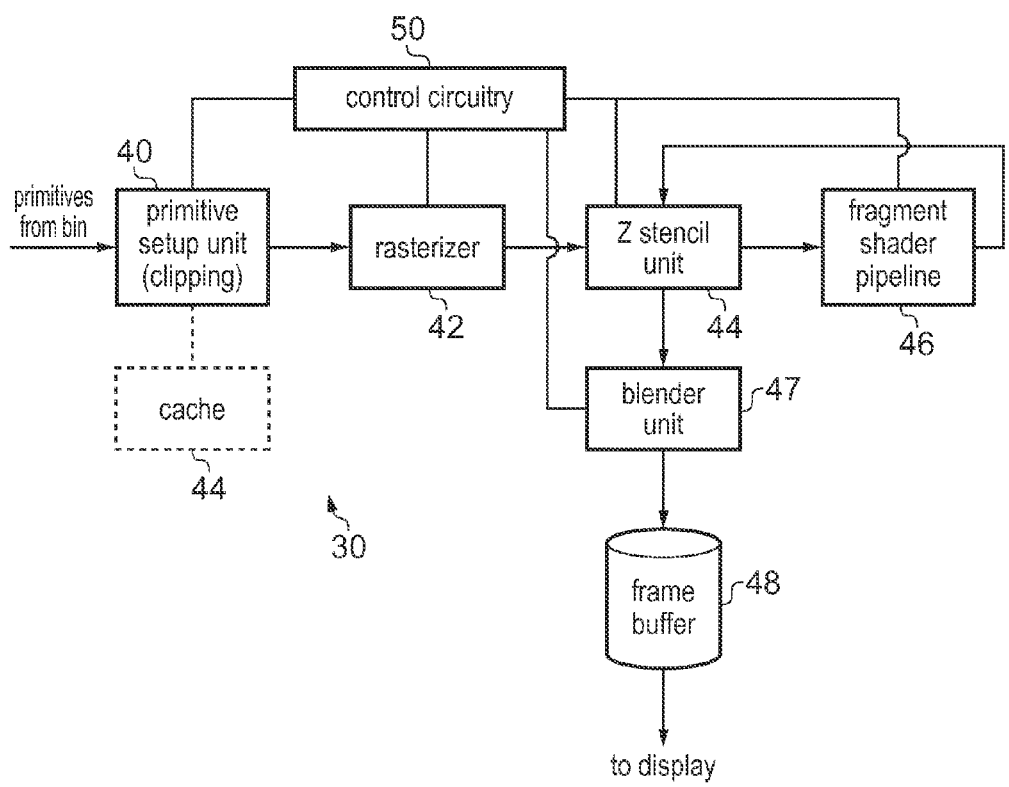

FIG. 1 is a flow diagram illustrating steps performed by a graphics processing pipeline according to one example. FIGS. 2A and 2B show an example of portions of the graphics processing pipeline. At step 2, geometry input is received. The geometry input identifies a number of graphics primitives to be displayed in a frame. Each primitive corresponds to a simple polygon such as a triangle or quadrilateral. For each primitive, the geometry input identifies the vertices of the primitive and some vertex data representing various attributes at each vertex position, such as the x and y coordinates of the vertex, a depth (Z) value, and colour, shading or transparency values, for example. At step 4, vertex shading is performed to apply various transformations to these primitives (or more particularly to the vertices defining the primitives), to generate modified properties of the vertices, as is known in the art. The vertex shading step may also be referred to as a transforming/lighting operation.

At step 6, the primitives and associated vertex data are subject to a tiling step in which each primitive is allocated to at least one tile making up the frame to be displayed. Based on the vertex positions of each primitive, an estimate can be made of whether each primitive is likely to overlap a particular tile, and if so then the primitive is allocated to the tile. Some primitives may be allocated to more than one tile if they are expected to cross multiple tiles. A primitive list defining the primitives corresponding to each tile is then stored in a primitive memory. The primitive list may comprise any data structure identifying the vertex data for each primitive (e.g. the primitive list need not necessarily be implemented as a list data structure).

The primitive list for each tile is then processed separately to generate output data for the corresponding tile. In some examples, a single tile may be processed at a time. In other examples, the graphics processing pipeline may have multiple parallel processing paths so that several tiles can be processed at once, but nevertheless each tile is still processed separately from other tiles. Hence, at step 8 the primitive list for the next tile to be processed is read from the primitive memory.

Figure 3:
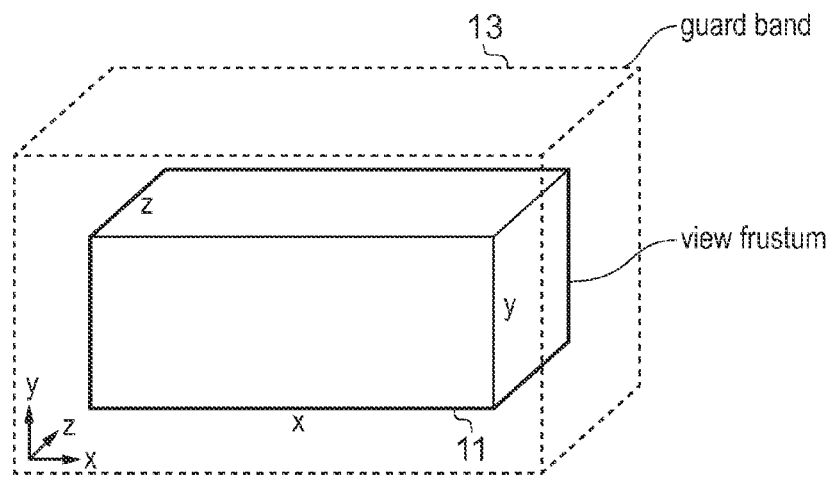
FIG. 3 illustrates an example of a view frustum and a guard band outside the view frustum to which clipping can be performed.

At step 10, a clipping process is performed for the current tile being processed. As shown in FIG. 3, a view frustum 11 may be defined which represents a 3-dimensional volume in which primitives may need to be rendered for display. The frustum 11 is bounded by top, left, bottom and right edge planes claims defining a viewport which typically corresponds to the size of the display screen in which the graphics are to be rendered, and near and far depth planes corresponding to the front and back of the view frustum 11 representing the closest distance and furthest distance away from the viewer that the primitives can appear when displayed. Since primitives lying outside the view frustum will not eventually be displayed, it is possible to clip the primitives to the view frustum 12 to reduce the amount of processing required. Some standards such as OpenGL and DirectX require such clipping to be performed. However, the clipping process can be slow and difficult to implement because clipping can require additional primitives to be generated. Therefore, some systems may choose to reduce the amount of clipping by providing a guard band 13 outside the view frustum 11 as shown in FIG. 3. By clipping primitives to the guard band 13 instead of the view frustum 11, the amount of clipping can be reduced.

Hence, clipping of primitives with respect to a clipping boundary may be performed at step 10, where the clipping boundary may correspond to the view frustum 11 or the guard band 13 or another boundary. As shall be discussed below there are many ways in which this clipping can be performed. In the example of FIG. 1, the clipping operation 10 is performed separately for each tile after the primitive list for the tile has been read from the primitive memory at step 8. This means that any additional vertex data generated during the clipping does not need to be read from the primitive memory, as would be the case for systems in which the clipping step 10 is performed before the tiling step 6. Hence, performing the clipping process 10 after step 8 helps to reduce the amount of primitive memory bandwidth required.

At step 12 a primitive setup operation is performed based on the primitives in the primitive list and any additional vertex data generated during the clipping operation 10. The primitive setup operation uses the vertex data defined for each primitive of the current tile being processed to determine a number of properties of that primitive. These properties may include an edge determination for determining the position of an edge of the primitive, a depth function determination to determine variation of a depth value across the primitive, and an interpolation function that represents the variation of attributes (such as colour, shading or transparency/opacity values) across the primitive. Techniques for performing the primitive setup operation are known in the art. These techniques can be modified to incorporate the clipping step 10 as a preliminary step to the primitive setup operation 12. Hence, any additional primitives generated at the clipping step 10 are also subject to the primitive setup operation 12. For example, the clipping step 10 may generate additional vertices for clipped primitives which may be represented using weights that determine how to determine the vertex data for the clipped primitives from the original vertex data of the corresponding primitive in the primitive list. The primitive setup step 12 may apply the weights to the vertex data from the primitive list before performing the determination of the various functions for the primitive using the weighted attribute values. This technique of applying weights to the vertex values is similar to actually interpolating some vertex attributes in the interpolation function, and so it is possible to reuse the processing unit that performs the interpolation for the weighting calculation.

After the primitive setup is completed for the current tile, a rasterization operation is performed at step 14 to convert each primitive into a number of graphics fragments. Any known rasterization technique may be used. Each graphics fragment may for example correspond to a pixel or a small group of pixels to be displayed. Each fragment may be associated with x, y coordinates specifying the fragment position.

At step 16, an early depth testing step is performed. Depth testing is an operation used to determine a depth value for each graphics fragment output by the rasterization operation, using the depth function calculated during the primitive setup operation at step 12. For each x, y position of the tile, a Z buffer value may be maintained to track the fragment that is closest to the viewer. The depth testing step 16 determines with reference to the Z buffer value whether each fragment will be displayed or will be occluded by another fragment that lies closer to the viewer. If a fragment is closer than the fragment currently indicated by the Z buffer value, then the Z buffer value is updated to indicate the closer fragment. Normally the depth function is set up to pass if the fragment is closer than the old fragment, however the depth function may have any compare function, so it could be the opposite, although that is not very common At step 18, a fragment shading operation is performed to determining various properties of each fragment. For example, the fragment shading may include colouring operations, shading operations, transparency operations, and other operations for determining the appearance of each fragment which is determined to be displayed by the early depth testing step 16. One or more shader programs may be invoked to perform the operations required for each graphic fragment. The fragments output from the fragment shading step are subjected to a late depth testing step 20 which is similar to the early depth testing operation at step 16. For example, the fragment shading operation at step 18 may have determined that some fragments are partially transparent, and so it may be necessary to blend properties of that fragment with properties of a previously drawn fragment. Hence, the late depth testing step 20 can determine which fragment is the next closest to the viewer. At step 22, a blending operation is performed to blend the properties of the closest fragment with one or more fragments behind that fragment.

At step 24, the processed fragments are output to the corresponding tile of a frame buffer. The frame buffer stores the display data which is to be output to the display. The frame buffer has storage regions corresponding to each tile. Each time processing of a tile is completed following steps 8 to 22, the output data for that tile is placed in the corresponding region of the frame buffer. At step 26 it is determined whether all the tiles for the current frame have been processed. If not, then the method returns to step 8 to process another tile. When the last tile has been processed, then the method proceeds to step 28 where the contents of the frame buffer are output to the display.

FIGS. 2A and 2B show portions of a graphics processing pipeline 30 for performing the method of FIG. 1. For example, the pipeline 30 may be part of a graphics processing unit (GPU). FIG. 2A shows a portion of the graphics processing pipeline 30 for performing steps 2 to 6 which are performed in common for the entire frame. A geometry buffer 32 stores the geometry data defining vertex data for each primitive. The geometry data is input to a vertex shader pipeline 34 for performing the vertex shading step 4. The vertex shader pipeline 34 transforms the vertex data for the primitives, for example implementing position transformations or vertex lighting transformations. A tiler unit 36 then bins the primitives' vertex data into corresponding tiles and generates, for each tile, a primitive list identifying the vertex data of the primitives corresponding to the tile. The primitive lists for each tile are stored in a primitive memory 38. The vertex data for each vertex of the primitive may include x, y coordinates, depth values, colour or transparency attributes at the vertex positions, and other properties of the vertices.

FIG. 2B shows a portion of the graphics processing pipeline 30 for performing tile processing separately for each tile (steps 8 to 28 of FIG. 1). A primitive setup unit 40 is provided which reads the primitive list for the current tile from the primitive memory 38. The primitive setup unit 40 is a modified primitive setup unit which performs the x, y clipping operation of step 10 as well as the primitive setup operation 12. This is different to previous systems in which x, y clipping with respect to a viewport or guard band is performed before the primitives lists are stored in the primitive memory 38. The clipping operation performed by the primitive setup unit 40 may generate additional vertex data defining additional vertices of one or more clipped primitives which were not in the original primitive list. The additional vertex data is subject to the primitive setup operation 12 along with the original vertex data from the primitive list. The primitive setup unit 40 may store additional vertex data generated in the clipping operation 10 in a cache 44. If another tile requires the same additional vertex data, then it can be accessed more quickly from the cache 44 than if the additional vertex data was generated again from the primitive list.

When the primitive setup unit 40 has finished the clipping and setup operations, then the vertex data for the primitives is passed to a rasterizer 42 which performs the rasterization operation 14. The output of the rasterizer 42 is passed to a Z stencil unit 44 which performs the early depth testing step 16. A fragment shader pipeline 46 performs the fragment shading operation 18 on the output of the Z stencil unit 44, and the shaded fragments are then passed back to the Z stencil unit 44 to perform the late depth testing step 20. The output of the late depth testing is then provided to a blender unit 47 which performs any required blending operations 22. The blended output is then written to the corresponding tile of the frame buffer 48. When all tiles are complete, the contents of the frame buffer 48 for the current frame are output to the display. Control circuitry 50 is provided for controlling the various units of the graphics processing pipeline 30.

The clipping operation at step 10 in FIG. 1 may be performed in different ways. Depth clipping of primitives with respect to the near and far depth planes of the view frustum 11 may be performed using any known prior art technique. The following description will describe various examples of performing x, y clipping with respect to the viewport formed by the top, bottom, left and right planes of the view frustum 11 or another clipping boundary such as the guard band 13.

Figure 5:
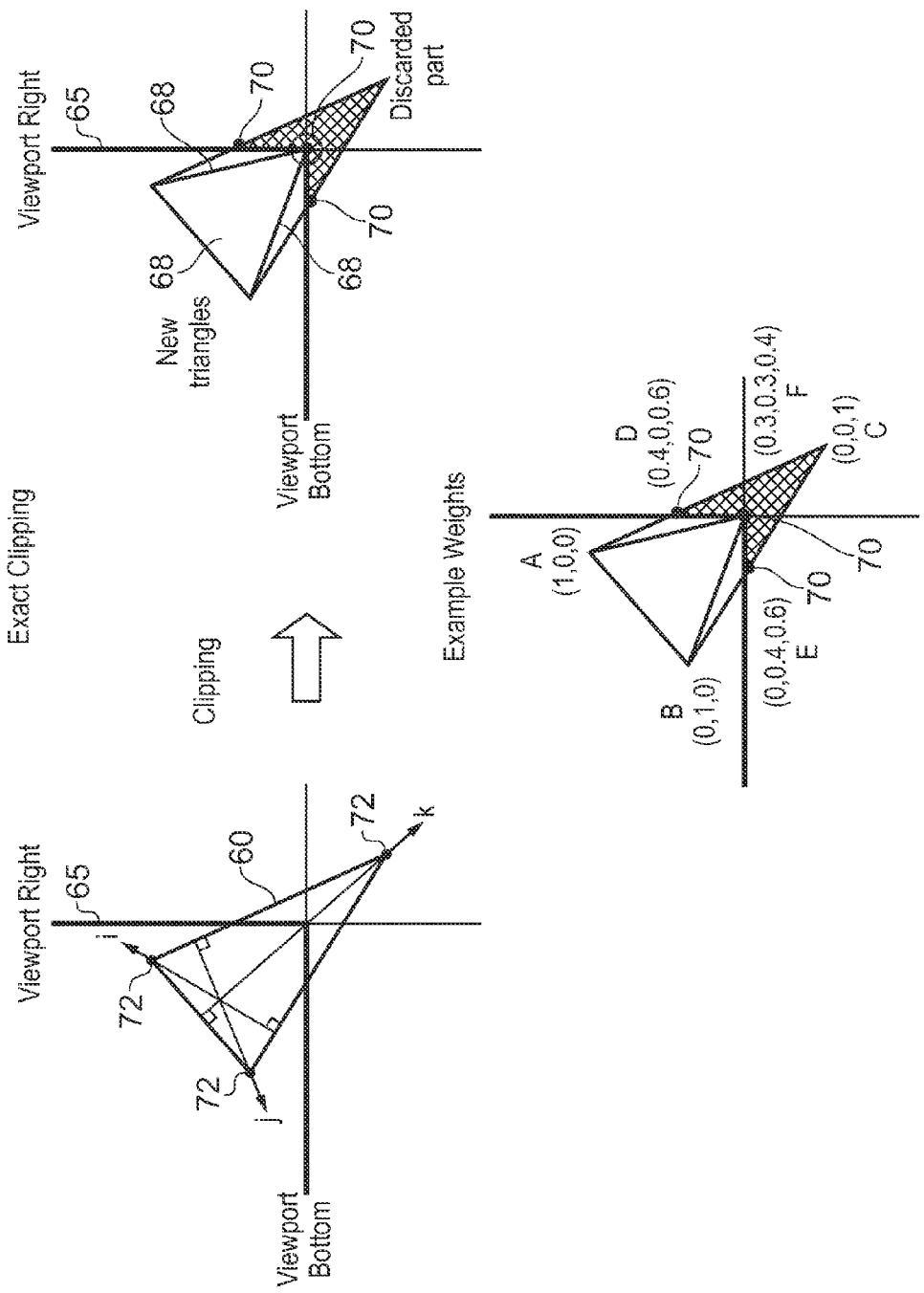
FIG. 5 shows an example of clipping a primitive exactly to a clipping boundary.

An example of clipping is shown in FIG. 5. In the top left of FIG. 5, a primitive 60 is shown which extends beyond the edge of the viewport (clipping boundary) 65. Portions of the primitive 60 lying outside the viewport will not eventually be displayed. To reduce the number of fragments that have to be generated and processed by the rasterization, depth testing, fragment shading and blending steps, the primitive 60 may be clipped exactly to the viewport 65 by replacing the primitive 60 with clipped primitives 68 which correspond exactly to the portion of the original primitive 60 that was within the viewport 65 (see the top right of FIG. 5). In this example, the portion lying within the viewport 65 cannot be represented with a single primitive (a triangle in this example), and so multiple clipped primitives 68 are required to match the portion of the original primitive 60 that was within the viewport 65. This means that a number of additional vertices 70, each with corresponding vertex data representing vertex position, depth, or colour, etc., are required to represent the new clipped primitives 68. As clipping may be required for many primitives, then clipping can result in the generation of a significant amount of new vertex data.

As shown in the lower half of FIG. 5 the amount of additional vertex information can be reduced to some extent by representing each new vertex using weights which determine properties of the new vertex 70 from corresponding properties of the original vertices 72 of the original primitive 60. For a triangular primitive, a barycentric coordinate system may be used which defines the weights with respect to axes, i, j, k extending at right angles to one of the edges of the triangles, passing through the opposite vertex of the triangle (see the axes i, j, k drawn in the top left of FIG. 5). For each axis, the weights extend from a value of 0 at the edge of the triangle to a value of 1 at the opposite corner of the triangle. Hence, as shown in the bottom part of FIG. 5, the weights of the vertices A, B, C of the triangle are represented using coordinates (i, j, k) of A=(1, 0, 0), B=(0, 1, 0) and C=(0, 0, 1).

The vertex data for the additional vertices 70 (D, E, F) can then be represented using weights relative to the corresponding vertex data of the original vertices 72 (A, B, C). In this example, additional vertex D is represented using weights of (0.4, 0, 0.6) which indicates that the x, y coordinates of vertex D can be determined as 0.4*A+0*B+0.6*C (where A, B and C represent the coordinates of the corresponding vertices A and C). The positions of additional vertices E, F can be derived from the positions of vertices A, B, C in a similar way. Attributes other than the vertex coordinates may also be generated in a similar way using the weights and the corresponding attributes of the original vertices. Some sets of attributes may share a common set of weights which can be used to derive each of the attributes from the corresponding attributes of the original vertices. Other attributes may have their own special weights defined for determining that attribute of the additional vertices 70 from the corresponding attribute of the original vertices 72. Also, while an example has been described above of determining the additional vertex data from the original vertex data using a linear combination of the original vertex data, in other examples the relationship may be non-linear.

Using weights in this way to represent the additional vertex data can reduce the amount of additional data generated in clipping to some extent. Nevertheless, there may still be a significant amount of new information generated. By performing the clipping in the primitive setup unit 40 separately for each tile, rather than before the primitive list is stored in the primitive memory 38, the amount of data in the primitive memory 38 can be significantly reduced.

Nevertheless, it is useful to avoid clipping where possible. The applicants have observed that it is often more important to perform clipping for larger primitives than for smaller primitives. This is because typically the vertex data and coordinates for each vertex are represented in a floating point format. Floating point number representation represents numbers using a significand, which represents the significant digits of the number, and an exponent which represents the position of a radix point (e.g. a binary point) within the significand. This allows a wider range of numeric values to be represented with a finite number of bits than would be possible with a fixed point representation. However, this additional numeric range is achieved at the expense of some loss of precision. If a very large range of values need to be represented, then it is no longer possible to represent increments between successive values at such a fine granularity.

For some very large primitives, which intersect the view frustum 12 but also extend a long way away from the view frustum 12, the floating point numbers representing the vertex positions may get very large, but it is also necessary to represent smaller values for the portions of the primitive that lie within the view frustum 12. If the range of coordinates that need to represented becomes wide enough, then some precision may be lost and so the resolution with which positions within the primitive can be identified may be reduced. This can cause problems. For example when performing texturing of fragments, the texture pattern may be defined at a reasonably high resolution, but for the larger primitives the position within the primitives at which the texture pattern can be applied can only be represented at a lower resolution. In this case, there may be some apparent loss of resolution when rendering the texture. Hence, various numerical precision and stability issues may occur for larger primitives which do not occur for smaller primitives.

Figure 4:
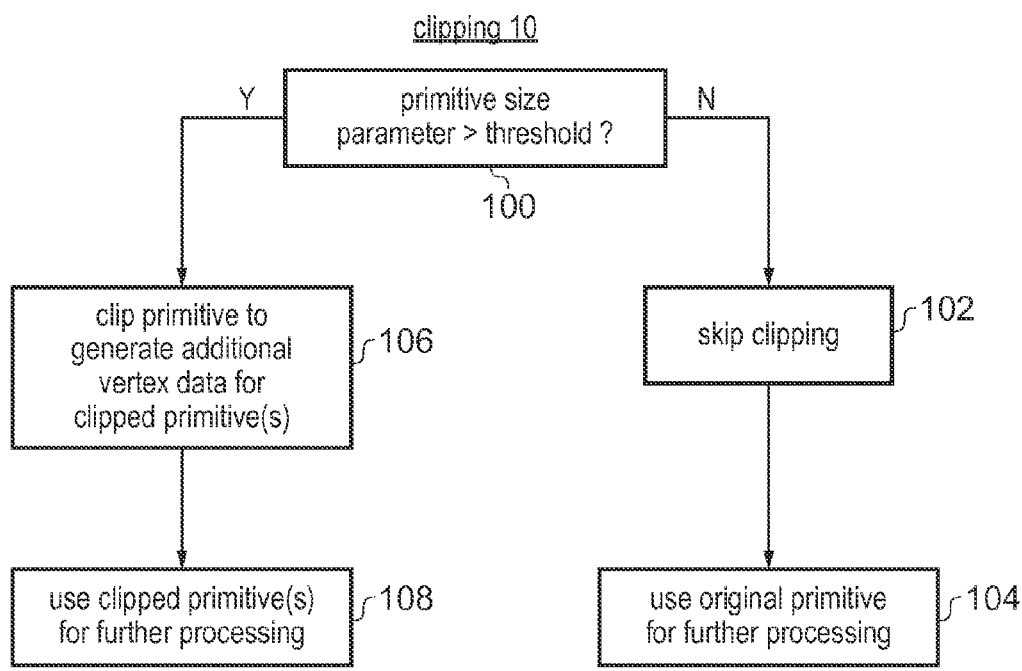
FIG. 4 illustrates an example of a clipping operation for clipping primitives with respect to a clipping boundary.

Therefore, the clipping process of step 10 may be performed as in the example of FIG. 4. At step 100, a primitive size parameter may be determined for a target primitive. The primitive sized parameter may be any parameter determined based on the x, y coordinates of the vertices of the primitive, which provides an indication of the overall size of the primitive. For example, the primitive size parameter may simply be the largest one of the x, y coordinates of the vertices for the primitive. Alternatively, a more complicated indication of size may be determined.

At step 100, it is determined whether the primitive size parameter for the primitive is greater than a predetermined threshold. If the size parameter is not greater than the threshold, then at step 102 clipping for the primitive is skipped or omitted, and then further graphics processing at step 104 uses the vertex data for the original primitive. On the other hand, if the primitive size parameter is larger than the threshold at step 100, then at step 106 the clipping of the primitive with respect to the clipping boundary is performed, to generate additional vertex data for one or more clipped primitives, and at step 108 the further graphics processing uses the clipped primitive(s) instead of the original primitive. The further graphics processing at steps 104, 108 may comprise the primitive setup, rasterization, depth testing, fragment shading and blending steps 12-22 for example.

Hence, the clipping operation may be performed only for large primitives and not for smaller ones. By setting the threshold for step 100 to an appropriate value, it can be ensured that clipping is only performed for the large primitives for which stability and precision issues arise in the floating point processing. In practice it has been found that for a single precision floating point representation, primitives which extend less than 32K ($2^{15}$) pixels along any axis do not typically cause floating point precision loss and so by setting the threshold so that primitives extending less than 32K pixels along an axis of the coordinate system are left unclipped, these numerical problems can be avoided while reducing the amount of clipping that needs to be performed. It has been found that for real-life benchmarks, over 99% of the primitives are smaller than this 32K threshold, so that even if they cross the clipping boundary, they do not need to be clipped. The remaining 1% of primitives can be clipped, and even if this requires a significant amount of processing or additional vertex data, this does not affect the overall performance of the graphics processing system significantly.

In some embodiments, even if a primitive has a size greater than the threshold, step 106 may clip only the edges of the primitive that are not shared with another primitive whose size is smaller than the threshold size. This ensures that shared edges are clipped equally for all primitives sharing that edge.

Figure 6:
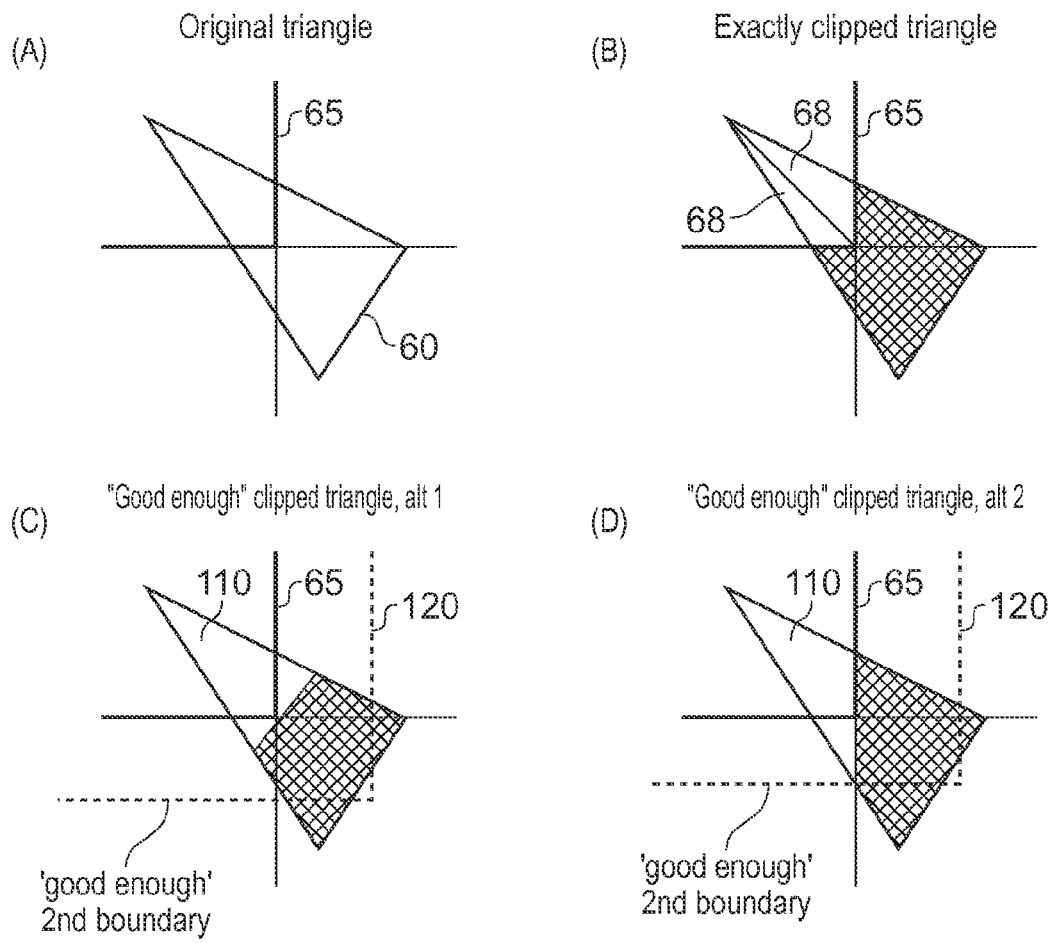
FIG. 6 illustrates examples of inexact clipping to generate a clipped primitive having a portion outside the clipping boundary.

FIG. 5 shows a technique where a primitive 60 is clipped exactly to the clipping boundary 65. However, this is not essential, and in other examples it is possible to clip the primitive in a different manner. FIG. 6 shows an example of inexact clipping with respect to a clipping boundary 65. The original primitive 60 is shown in part A of FIG. 6. For comparison, part B of FIG. 6 shows exact clipping to the clipping boundary 65 to generate multiple clipped primitives 68 in a similar way to FIG. 5. However, clipping the primitive exactly to the clipping boundary 65 may require more than one new primitive 68 to be generated, increasing the amount of vertex data to be processed.

To reduce the amount of additional data, the clipping can instead be performed as shown in parts C or D of FIG. 6 so that only a single clipped primitive 110 is generated. If the portion of the original primitive 60 that lies within the clipping boundary 65 cannot be represented using only one primitive, then instead a single primitive 110 is generated including a portion outside the clipping boundary 65. By allowing inexact clipping, it is not necessary to generate multiple clipped primitives 65 and instead a single clipped primitive 110 can be generated which requires less additional vertex data. As discussed above, omitting clipping is only a problem if the primitive is large enough to cause numerical precision and stability issues with floating point processing. Hence, a second boundary 120 may be defined which marks the edge of the region where numerical precision issues start to occur (for example, the boundary 120 may correspond to the 32K pixel threshold discussed above for FIG. 4). As long as the original primitive 60 is clipped to lie entirely within the second boundary 120, then the clipping will be good enough to avoid loss of floating point precision, even if the primitive is not clipped exactly to the clipping boundary 65.

As shown in parts C and D of FIG. 6, there may be several different clipped primitives 110 which can satisfy the clipping requirements. In the embodiment of FIG. 6, it may be useful for the clipped primitive 110 to satisfy the following requirements: (a) the clipped primitive 110 at least covers the portion of the original primitive 60 that lies within the clipping boundary 65; (b) the clipped primitive should be a single primitive 110; and (c) the entire clipped primitive 110 should lie within the second boundary 120. Where there are several candidate clipped primitives 110 that can satisfy these conditions, such as the two candidates shown in parts C and D of FIG. 6, then the primitive setup unit 40 may select the clipped primitive 110 so that it reduces the memory or processing overhead associated with processing the weights for determining the vertex data for the vertices of the new clipped primitive 110. For example, one of the candidates may have cheaper weights or may be able to be represented by weights which require simpler processing than the other candidate. If so, then the candidate which requires the least overhead to process may be selected.

Hence, the clipping operation 10 of FIG. 1, or the clipping step 106 of FIG. 4, may either clip exactly to the clipping boundary 65 as shown in FIG. 5, or may clip inexactly to generate a single clipped primitive as shown in FIG. 6.

Figure 7:
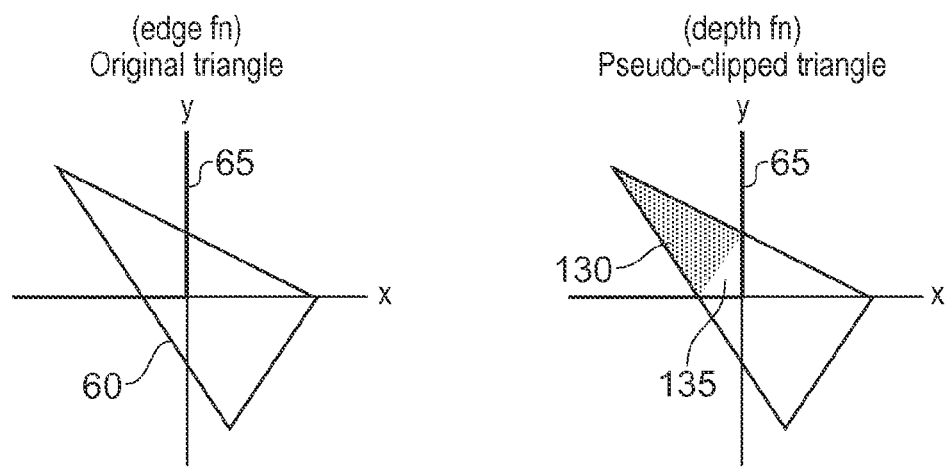
FIG. 7 illustrates an example of "pseudo clipping" of a primitive for the purposes of depth function calculation while using the original unclipped primitive for other functions.

Another way of reducing the overhead of performing clipping is shown in FIG. 7. The inventors have observed that the problems associated with loss of floating point precision for large primitives tend to occur mainly for the depth function calculation of the primitive setup operation at step 12. Other parts of the primitive setup operation, such as the edge determination and determination of barycentric properties of the primitive, are numerically stable and so these operations do not tend to cause errors even if primitives are left unclipped. For the edge determination, any instabilities only come for large triangles and the error is never larger than any error that would have been introduced by clipping, and so the error is within acceptable bounds. Barycentrics may also be affected by numerical instability, however since they are in fact a multiple of the edge equations, it is only the magnitude which is numerically unstable, not the offset, and since we have the property that i+j+k=1, a final division of the sum of i+j+k will make sure that the error in the magnitude is cancelled, such that the remaining error is negligible. Hence, the numerical issues are relatively insignificant for the edge determination and determination of the barycentric properties. However, for depth equations it is required to calculate the area of the triangle. The area of the triangle is numerically unstable for long narrow triangles, especially when two angles are close to 0 and the last one close to 180 degrees. Thus it may be difficult to calculate the az, bz and cz coefficients accurately for triangles. Further, since the depth plane is calculated as z=az*x+bz*y+cz, the same type of triangles may cause instability between cz and az*x or bz*y if az and bz have several orders of magnitude difference. Clipping increases the angles of the triangles and as such reduces the instability in the area calculation and any dependent computations.

As most of the numerical problems occur with the depth function calculation, then a temporary clipping may be performed and the clipped primitives may be used only for the depth function calculation. Once the depth function has been calculated, then the additional vertex data for the clipped primitive may be discarded as it is not needed any more. Other parts of the primitive setup operation and the subsequent graphics processing, such as the edge determination, can be based on the original primitives 60. This means that the large majority of the graphics processing in FIG. 1 can use the original vertex data of the original primitives and need not consider any additional vertex data of any clipped primitives, reducing the amount of data that needs to be processed. This technique may be referred to as "pseudo clipping". An advantage of this technique is that there is no change to the determination of the edge line equation and barycentrics for the primitive compared to the original primitive 60.

As shown in FIG. 7, if the pseudo clipped primitive 130 is used for the depth function only then it is not necessary for the pseudo clipped primitive 130 to cover all of the internal portion of the original primitive 60 that lies within the clipping boundary 65. It is possible to generate the pseudo clipped primitive 130 so that it covers a smaller area than the internal region of the original primitive 60 (as shown in the darker grey portion of the right hand part of FIG. 7). Generating a smaller pseudo clipped primitive 130 may be useful sometimes to generate cheaper weights for the additional vertex data to be used in the depth function calculation. If the pseudo clipped primitive 130 does not cover all the area within the boundary 65, then the depth function determined using this primitive 130 would not cover the corner 135 of the region within the clipping boundary 65. Even though the subsequent evaluation of depth values in the bottom right corner of the view port will be using positions outside the primitive 130 for which the depth function was calculated, it has been found that the processing still produces correct results.

While the different clipping techniques shown in FIGS. 4 to 7 are discussed in the context of a tile-based renderer, in other embodiments these techniques may be used in another form of renderer, such as an immediate mode renderer. Similarly, while these clipping techniques are performed at step 10 of FIG. 1, separately for each tile, in other embodiments these clipping techniques may be used at a clipping step performed before the tiling step 6, so that any additional vertex data generated in the clipping is stored in the primitive memory. In general, the technique of FIG. 4 can be used to reduce the number of primitives for which clipping is performed. Where clipping is performed, the technique of FIG. 6 can reduce the number of additional clipped primitives, and hence the amount of additional vertex data, generated during the clipping, and the technique of FIG. 7 can be used to reduce the number of subsequent graphics processing operations that require the additional vertex data so that less processing is required as a whole.

Figure 8:
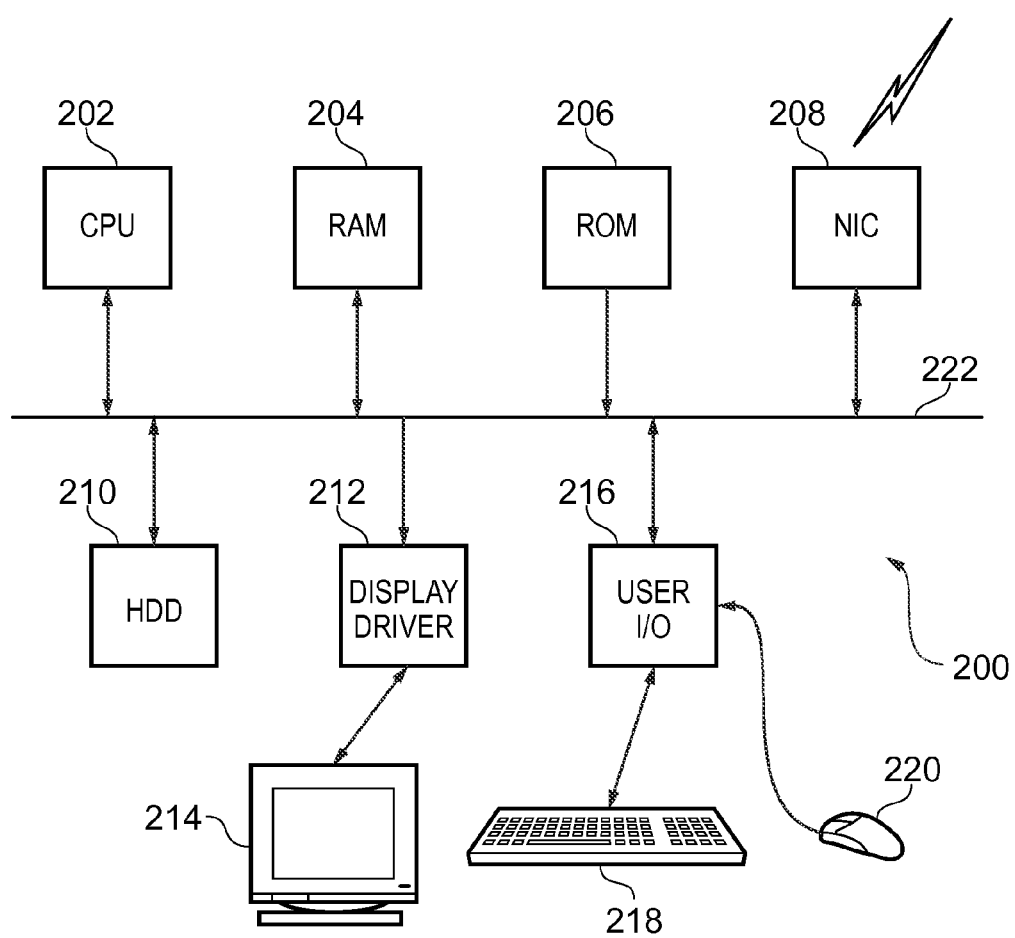
FIG. 8 illustrates an example of a computer system which can be used to perform the present technique.

While FIGS. 2A and 2B show a graphics processing pipeline architecture for performing the present techniques, in other examples the processing operations may be performed using a general purpose computer programmed by software to perform the processing of the graphics primitives. FIG. 8 schematically illustrates an example of a general purpose computer 200 that may be used to implement the above described techniques. The general purpose computer 200 includes a central processing unit 202, a random access memory 204, a read only memory 206, a network interface card 208, a hard disk drive 210, a display driver 212 and monitor 214 and a user input/output circuit 216 with a keyboard 218 and mouse 220 all connected via a common bus 222. In operation the central processing unit 202 may execute computer program instructions that may be stored in one or more of the random access memory 204, the read only memory 206 and the hard disk drive 210 or dynamically downloaded via the network interface card 208. The results of the processing performed may be displayed to a user via the display driver 212 and the monitor 214. User inputs for controlling the operation of the general purpose computer 200 may be received via the user input output circuit 216 from the keyboard 218 or the mouse 220. It will be appreciated that the computer program could be written in a variety of different computer languages. The computer program may be stored and distributed on a recording medium or dynamically downloaded to the general purpose computer 200. When operating under control of an appropriate computer program, the general purpose computer 200 can perform the above described techniques and can be considered to form an apparatus for performing the above described techniques. The architecture of the general purpose computer 200 could vary considerably and FIG. 8 is only one example. For example, rather than a desktop system as indicated in FIG. 8, the technique could be implemented on a mobile device such as a smart phone or tablet computer. The various buffers 32, 38, 48 shown in FIGS. 2A and 2B may be implemented as storage regions within the RAM 204, and the processing units 34, 36, 40, 42, 44, 46, 47, 48, 50 of FIGS. 2A and 2B may be implemented using software algorithms executed by the CPU 202, for example.

The following numbered clauses set out other non-limiting example arrangements:

1. A method of processing graphics primitives for display, wherein the primitives have vertex coordinates represented in floating-point format, comprising steps of:

performing a clipping operation on a target primitive with respect to a clipping boundary to generate a single clipped primitive corresponding to the target primitive that extends beyond the clipping boundary by a smaller amount than the target primitive; and performing at least one graphics processing operation using the clipped primitive;

wherein if an internal portion of the target primitive lying within the clipping boundary cannot be represented using only one primitive, then the clipping operation generates the single clipped primitive comprising an internal region corresponding to said internal portion of the target primitive and an external region lying beyond the clipping boundary.

2. The method according to clause 1, wherein the clipping operation generates the single clipped primitive to lie within a second boundary, and the second boundary is outside the clipping boundary.

3. The method according to clause 2, wherein a primitive lying within the second boundary is processed by the at least one graphics processing operation without errors caused by loss of floating-point precision.

4. The method according to any of clauses 1 to 3, wherein the clipping operation generates weight values for determining additional vertex data of the single clipped primitive from vertex data of the target primitive.

5. The method according to clause 4, wherein the clipping operation selects the single clipped primitive from a plurality of candidate clipped primitives to reduce a memory overhead or processing overhead associated with handling the weight values for the single clipped primitive.

6. An apparatus for processing graphics primitives for display, wherein the primitives have vertex coordinates represented in floating-point format, the apparatus comprising processing circuitry configured to:

(i) perform a clipping operation on a target primitive with respect to a clipping boundary to generate a single clipped primitive corresponding to the target primitive that extends beyond the clipping boundary by a smaller amount than the target primitive; and (ii) perform at least one graphics processing operation using the clipped primitive;

wherein if an internal portion of the target primitive lying within the clipping boundary cannot be represented using only one primitive, then the clipping operation generates the single clipped primitive comprising an internal region corresponding to said internal portion of the target primitive and an external region lying beyond the clipping boundary.

7. An apparatus for processing graphics primitives for display, wherein the primitives have vertex coordinates represented in floating-point format, the apparatus comprising processing means for:

(i) performing a clipping operation on a target primitive with respect to a clipping boundary to generate a single clipped primitive corresponding to the target primitive that extends beyond the clipping boundary by a smaller amount than the target primitive; and (ii) performing at least one graphics processing operation using the clipped primitive;

wherein if an internal portion of the target primitive lying within the clipping boundary cannot be represented using only one primitive, then the clipping operation generates the single clipped primitive comprising an internal region corresponding to said internal portion of the target primitive and an external region lying beyond the clipping boundary.

8. A method of processing a graphics primitive for display, wherein the primitive has vertex coordinates represented in floating-point format, comprising steps of:

performing a primitive setup operation comprising an edge determination for determining which positions are inside or outside an edge of a target primitive and a depth function determination for determining a depth function for determining depth values within the target primitive; and performing a further graphics processing operation using the target primitive, the edge determination, and the depth function;

wherein if the target primitive satisfies a clipping condition, then the depth function determination is performed using a clipped primitive that extends beyond the clipping boundary by a smaller amount than the target primitive, and the edge determination is performed using the target primitive without clipping.

9. The method of clause 8, wherein the clipped primitive comprises a single clipped primitive which does not correspond exactly to an internal portion of the target primitive lying within the clipping boundary if the internal portion of the target primitive cannot be represented using only one primitive.

10. The method of clause 9, wherein for at least one target primitive, the clipped primitive has a smaller area than the internal portion of the target primitive.

11. An apparatus for processing a graphics primitive for display, wherein the primitive has vertex coordinates represented in floating-point format, the apparatus comprising:

primitive setup circuitry configured to perform a primitive setup operation comprising an edge determination for determining which positions are inside or outside an edge of a target primitive and a depth function determination for determining a depth function for determining depth values within the target primitive; and processing circuitry configured to perform a further graphics processing operation using the target primitive, the edge determination, and the depth function;

wherein if the target primitive satisfies a clipping condition, then the primitive setup circuitry is configured to perform the depth function determination using a clipped primitive that extends beyond the clipping boundary by a smaller amount than the target primitive, and to perform the edge function determination using the target primitive without clipping.

12. An apparatus for processing a graphics primitive for display, wherein the primitive has vertex coordinates represented in floating-point format, the apparatus comprising:

primitive setup means for performing a primitive setup operation comprising an edge determination for determining which positions are inside or outside an edge of a target primitive and a depth function determination for determining a depth function for determining depth values within the target primitive; and processing means for performing a further graphics processing operation using the target primitive, the edge function determination, and the depth function;

wherein if the target primitive satisfies a clipping condition, then the primitive setup means is configured to perform the depth function determination using a clipped primitive that extends beyond the clipping boundary by a smaller amount than the target primitive, and to perform the edge determination using the target primitive without clipping.

13. A method of processing graphics primitives for a frame to be displayed, the method comprising steps of:

allocating each primitive to at least one of a plurality of tiles forming the frame to be displayed;

for each tile, storing in a primitive memory a primitive list identifying vertex data for vertices of the primitives allocated to the corresponding tile; and performing tile processing separately for each tile, the tile processing comprising:

(i) reading the primitive list for the tile from the primitive memory;

(ii) if the primitive list identifies a target primitive that satisfies a clipping condition, performing a clipping operation for clipping the target primitive with respect to the clipping boundary to generate additional vertex data for at least one additional vertex for a clipped primitive not identified in the primitive list, the clipped primitive extending beyond the clipping boundary by a smaller amount than the target primitive;

(iii) performing at least one further graphics processing operation using the vertex data identified in the primitive list and the additional vertex data generated by the clipping operation; and (iv) outputting display data generated by the at least one further graphics processing operation for the tile.

14. A method of processing graphics primitives for display, wherein the primitives have vertex coordinates represented in floating-point format, comprising steps of:

determining, based on the vertex coordinates for a target primitive to be processed, a primitive size parameter indicative of a size of the target primitive;

if the primitive size parameter exceeds a predetermined threshold, performing a clipping operation on the target primitive with respect to a clipping boundary to generate at least one clipped primitive which extends beyond the clipping boundary by a smaller amount than the target primitive, and performing at least one graphics processing operation using the at least one clipped primitive; and if the primitive size parameter does not exceed the predetermined threshold, omitting the clipping operation for the target primitive and performing the at least one graphics processing operation using the target primitive.

15. A computer-readable storage medium storing a computer program which, when executed by a computer, controls the computer to perform the method of any of clauses 1 to 5, 8 to 10, 13 and 14.

Although illustrative embodiments have been described in detail herein with reference to the accompanying drawings, it is to be understood that the invention is not limited to those precise embodiments, and that various changes and modifications can be effected therein by one skilled in the art without departing from the scope and spirit of the appended claims.

The invention claimed is:

1. A method of processing graphics primitives for a frame to be displayed, the method comprising steps of:
  allocating each primitive to at least one of a plurality of tiles forming the frame to be displayed;
  for each tile, storing in a primitive memory a primitive list identifying vertex data for vertices of the primitives allocated to the corresponding tile; and
  performing tile processing separately for each tile, the tile processing comprising:
  (i) reading the primitive list for the tile from the primitive memory;
  (ii) if the primitive list identifies a target primitive that satisfies a clipping condition, performing a clipping operation for clipping the target primitive with respect to the clipping boundary to generate additional vertex data for at least one additional vertex for a clipped primitive not identified in the primitive list, the clipped primitive extending beyond the clipping boundary by a smaller amount than the target primitive;
  (iii) performing at least one further graphics processing operation using the vertex data identified in the primitive list and the additional vertex data generated by the clipping operation; and
  (iv) outputting display data generated by the at least one further graphics processing operation for the tile.

2. The method according to claim 1, wherein the additional vertex data generated by the clipping operation is stored in a cache memory having a lower access latency than the primitive memory.

3. The method according to claim 1, wherein the additional vertex data is represented by weight values for determining the additional vertex data from the vertex data of the target primitive.

4. The method according to claim 1, wherein the clipping boundary corresponds to a boundary of a view frustum.

5. The method according to claim 1, wherein the clipping boundary is outside a boundary of a view frustum.

6. The method according to claim 1, wherein the clipping condition is satisfied if the target primitive extends beyond the clipping boundary.

7. The method according to claim 1, wherein the clipping condition is satisfied if the target primitive extends beyond the clipping boundary and a primitive size parameter indicative of a size of the target primitive exceeds a predetermined threshold.

8. The method according to claim 1, wherein the at least one further graphics processing operation comprises at least one of:
  a primitive setup operation comprising at least one of an edge determination for determining which positions are inside or outside an edge of the primitive and a depth function determination for determining a depth function for determining depth values within the primitive; and
  a rasterization operation for calculating position data for a plurality of graphics fragments to be used to represent the primitive.

9. An apparatus for processing graphics primitives for a frame to be displayed, comprising:
  allocation circuitry configured to allocate each primitive to at least one of a plurality of tiles forming the frame to be displayed;
  a primitive memory configured to store for each tile a primitive list identifying vertex data for vertices of the primitives allocated to the corresponding tile; and
  a tile processing pipeline configured to perform tile processing separately for each tile, the tile processing comprising:
  (i) reading the primitive list for the tile from the primitive memory;
  (ii) if the primitive list identifies a target primitive that satisfies a clipping condition, performing a clipping operation for clipping the target primitive with respect to the clipping boundary to generate additional vertex data for at least one additional vertex for a clipped primitive not identified in the primitive list, the clipped primitive extending beyond the clipping boundary by a smaller amount than the target primitive;
  (iii) performing at least one further graphics processing operation using the vertex data identified in the primitive list and the additional vertex data generated by the clipping operation; and
  (iv) outputting display data generated by the at least one further graphics processing operation for the tile.

10. An apparatus for processing graphics primitives for a frame to be displayed, comprising:
  allocation means for allocating each primitive to at least one of a plurality of tiles forming the frame to be displayed;
  primitive memory means for storing for each tile a primitive list identifying vertex data for vertices of the primitives allocated to the corresponding tile; and
  tile processing means for performing tile processing separately for each tile, the tile processing comprising:
  (i) reading the primitive list for the tile from the primitive memory means;
  (ii) if the primitive list identifies a target primitive that satisfies a clipping condition, performing a clipping operation for clipping the target primitive with respect to the clipping boundary to generate additional vertex data for at least one additional vertex for a clipped primitive not identified in the primitive list, the clipped primitive extending beyond the clipping boundary by a smaller amount than the target primitive;
  (iii) performing at least one further graphics processing operation using the vertex data identified in the primitive list and the additional vertex data generated by the clipping operation; and
  (iv) outputting display data generated by the at least one further graphics processing operation for the tile.

* * * * *